(12) United States Patent
Mucke

(10) Patent No.: US 9,161,301 B2
(45) Date of Patent: Oct. 13, 2015

(54) REDUCING POWER CONSUMPTION WHEN BRIDGING INDEPENDENT CHIPSETS

(71) Applicant: Apple Inc., Cupertino, CA (US)

(72) Inventor: Christian W. Mucke, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 162 days.

(21) Appl. No.: 13/760,689

(22) Filed: Feb. 6, 2013

(65) Prior Publication Data

US 2014/0219146 A1    Aug. 7, 2014

(51) Int. Cl.
*G08C 17/00* (2006.01)
*H04W 52/02* (2009.01)

(52) U.S. Cl.
CPC ............ *H04W 52/0209* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 7,302,512 B1 * | 11/2007 | Currid et al. | 710/268 |
| 7,376,091 B1 | 5/2008 | Eccles et al. | |
| 2008/0008161 A1 | 1/2008 | Aldaz et al. | |
| 2009/0028115 A1 | 1/2009 | Hirsch | |
| 2010/0125653 A1 * | 5/2010 | Cherian et al. | 709/223 |
| 2010/0250974 A1 * | 9/2010 | Ristic et al. | 713/300 |
| 2011/0002295 A1 * | 1/2011 | Ghosal et al. | 370/331 |
| 2011/0264902 A1 * | 10/2011 | Hollingworth | 713/2 |
| 2012/0026992 A1 * | 2/2012 | Navda et al. | 370/338 |
| 2013/0343250 A1 * | 12/2013 | Homchaudhuri et al. | 370/311 |
| 2014/0206346 A1 * | 7/2014 | Kiukkonen et al. | 455/426.1 |

FOREIGN PATENT DOCUMENTS

| | | |
|---|---|---|
| GB | 2476851 | 7/2011 |
| WO | 2012/143941 | 10/2012 |

* cited by examiner

*Primary Examiner* — Chi H Pham
*Assistant Examiner* — Fahmida Chowdhury
(74) *Attorney, Agent, or Firm* — Downey Brand LLP

(57) ABSTRACT

A wireless communication device architecture is provided. The wireless communication device can include a WLAN chipset, a cellular chipset, and an application processor. The application processor can include a first portion and a second portion. The first portion can include at least one root complex powered via a dedicated power domain, which can be independent of at least one second power domain that can power the second portion. The WLAN chipset can coupled to a first port of the at least one root complex via a first interface. The cellular chipset can be coupled to a second port of the at least one root complex via a second interface. The at least one root complex can use power received via the dedicated power domain to bridge the WLAN chipset and the cellular chipset while the second portion of the application processor is sleeping.

20 Claims, 7 Drawing Sheets

REDUCING POWER CONSUMPTION WHEN BRIDGING INDEPENDENT CHIPSETS

FIELD OF THE DESCRIBED EMBODIMENTS

The described embodiments relate generally to wireless communication devices and more particularly to reducing power consumption when bridging independent chipsets.

BACKGROUND

Modern wireless communication devices often support both wireless local area network (WLAN) connections and cellular connections. In some scenarios, data can be exchanged between a WLAN chip and a cellular chip. For example, in the case of device tethering, a wireless communication device can serve as a WLAN access point and enable one or more further devices, referred to as tethered devices, share a cellular network connection with the wireless communication device.

In most present device architectures, the WLAN chip and the cellular chip are each connected to an application processor. As such, in a tethering scenario, data arriving from the cellular network has to be passed from the cellular chip to the application processor, and then from the application processor to the WLAN chip, which can forward the data to the tethered device. Bridging the WLAN chip and the cellular chip via the application processor in this manner can result in the application processor drawing power to stay in an active state to support the bridging even if the application processor is not performing any further function.

Some attempts have been made to reduce the power drawn to support conveying data in support of tethering through the use of integrated WLAN and cellular chips, which provide both WLAN and cellular connectivity on a single chip. Such integrated WLAN and cellular chips can autonomously handle tethering-related communication between the WLAN and cellular stacks without involving the application processor, and thus can reduce power consumption by enabling the application processor to sleep during tethering. However, usage of an integrated WLAN and cellular chip can be undesirable, as it can limit flexibility in device design.

In another alternative architecture that can be used to reduce the power drawn to support tethering, a direct link can be implemented between the WLAN chip and the cellular chip to enable forwarding of data between the two chips without involving the application processor. However, this architecture requires the implementation of an additional high speed interface on both the WLAN chip and the cellular chip to support the direct link, which can result in increased cost, and which can undesirably increase the chipset footprint in size-limited mobile devices.

SUMMARY OF THE DESCRIBED EMBODIMENTS

Some embodiments disclosed herein provide for reduced power consumption when bridging independent chipsets. For example, a wireless communication device in accordance with some example embodiments can implement separate WLAN and cellular chipsets, which can be interfaced by an application processor. The application processor of such example embodiments can be divided into two or more portions, with one portion including one or more root complexes that can be interfaced with both the WLAN chipset and the cellular chipset. The portion of the application processor including the root complex can be powered via a dedicated power domain such that the root complex(es) can draw power to support bridging the WLAN and cellular chipsets while a remaining portion of the application processor can be in a sleep state. As such, example embodiments disclosed herein can provide reduced power consumption for cases such as tethering in which data can be exchanged between the WLAN chipset and the cellular chipset, while offering the design advantages, and potentially business advantages, of architectures using separate WLAN and cellular chips without necessitating implementation of a dedicated interface directly linking the WLAN and cellular chips.

In a first embodiment, a wireless communication device including a WLAN chipset, cellular chipset, and an application processor is provided. The application processor of the first embodiment can include a first portion and a second portion. The first portion of the application processor can include at least one root complex powered via a dedicated power domain. The dedicated power domain can be independent of at least one second power domain that can be configured to power the second portion of the application processor. The WLAN chipset of the first embodiment can be coupled to a first port of the at least one root complex via a first interface. The cellular chipset of the first embodiment can be coupled to a second port of the at least one root complex via a second interface. The at least one root complex can be configured to use power received via the dedicated power domain to bridge the WLAN chipset and the cellular chipset to convey data between the WLAN chipset and the cellular chipset while the second portion of the application processor is sleeping.

In a second embodiment, a wireless communication device for sharing a network connection is provided. The wireless communication device of the second embodiment can include a WLAN chipset, cellular chipset, and an application processor. The application processor of the second embodiment can include a first portion and a second portion. The first portion of the application processor can include at least one root complex powered via a dedicated power domain. The dedicated power domain can be independent of at least one second power domain that can be configured to power the second portion of the application processor. The WLAN chipset of the second embodiment can be coupled to a first port of the at least one root complex via a first Peripheral Component Interconnect Express (PCIe) bus interface. The cellular chipset of the second embodiment can be coupled to a second port of the at least one root complex via a second PCIe bus interface. The wireless communication device of the second embodiment can be configured to share a connection to a cellular network supported by the cellular chipset with a tethered device coupled to the wireless communication device via a WLAN connection supported by the WLAN chipset. The at least one root complex can be configured to use power received via the dedicated power domain to implement a peer-to-peer (P2P) function to bridge the WLAN chipset and the cellular chipset to convey data exchanged between the tethered device and the cellular network while the second portion of the application processor is sleeping.

In a third embodiment, a method for sharing a network connection is provided. The method of the third embodiment can include a wireless communication device establishing a connection to a cellular network. The wireless communication device can include a WLAN chipset, a cellular chipset, and an application processor. The connection to the cellular network can be supported by the cellular chipset. The application processor can include a first portion and a second portion. The first portion of the application processor can include at least one root complex powered via a dedicated power domain. The dedicated power domain can be independent of at least one second power domain that can be configured to power the second portion of the application processor. The at least one root complex can include a first port coupled to the WLAN chipset via a first interface and a second port coupled to the cellular chipset via a second interface. The method of the third embodiment can further include the wireless communication device establishing an association with a tethered device via a WLAN connection supported by the WLAN chipset to share the connection to the cellular network with the tethered device. The method of the third embodiment can additionally include the wireless communication device triggering a peer-to-peer (P2P) function on the at least one root complex to bridge the WLAN chipset and the cellular chipset to convey data exchanged between the tethered device and the cellular network. The at least one root complex can use power received via the dedicated power domain to bridge the WLAN chipset and the cellular chipset while the second portion of the application processor is sleeping in an instance in which application processor is not performing any further activity.

In a fourth embodiment, a computer program product for sharing a network connection is provided. The computer program product of the third embodiment can include at least one non-transitory computer readable storage medium having program code stored thereon. The program code of the fourth embodiment can include program code for causing a wireless communication device to establish a connection to a cellular network. The wireless communication device can include a WLAN chipset, a cellular chipset, and an application processor. The connection to the cellular network can be supported by the cellular chipset. The application processor can include a first portion and a second portion. The first portion of the application processor can include at least one root complex powered via a dedicated power domain. The dedicated power domain can be independent of at least one second power domain that can be configured to power the second portion of the application processor. The at least one root complex can include a first port coupled to the WLAN chipset via a first interface and a second port coupled to the cellular chipset via a second interface. The program code of the fourth embodiment can further include program code for causing the wireless communication device to establish an association with a tethered device via a WLAN connection supported by the WLAN chipset to share the connection to the cellular network with the tethered device. The program code of the fourth embodiment can additionally include program code for triggering a peer-to-peer (P2P) function on the at least one root complex to bridge the WLAN chipset and the cellular chipset to convey data exchanged between the tethered device and the cellular network. The program code of the fourth embodiment can also include program code for controlling the at least one root complex using power received via the dedicated power domain to bridge the WLAN chipset and the cellular chipset while the second portion of the application processor is sleeping in an instance in which application processor is not performing any further activity.

The above summary is provided merely for purposes of summarizing some example embodiments of the invention so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of the disclosure will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

DETAILED DESCRIPTION OF SELECTED EMBODIMENTS

Representative applications of the methods, apparatuses, and computer program products disclosed herein are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Some example embodiments disclosed herein provide for reducing power consumption when bridging independent chipsets within wireless communication devices. In this regard, various example embodiments disclosed herein address the consumption of power by an application processor being used to bridge two chipsets, such as a WLAN chipset and a cellular chipset, to support communication of the chipset when the application processor is not performing any further functionality. More particularly, some example embodiments provide an application processor divided into two or more portions, with one portion including one or more root complexes that can be interfaced with respective chipsets to be bridged. The portion of the application processor including the root complex can be powered via a dedicated power domain such that the root complex(es) can draw power to support bridging the chipsets while a remaining portion of the application processor can be in a sleep state if the application processor is not performing any further functionality. Accordingly, such example embodiments can reduce power consumption when bridging chipsets via an application processor by using a dedicated power domain to power the bridging root complex while allowing the remaining portion of the application processor to sleep if not performing further functionality. As such, the entire application processor of such example embodiments does not have to remain in an active, power drawing state merely to support bridging chipsets. Further, such example embodiments offer the design advantages of architectures using separate WLAN and cellular chips without necessitating implementation of a dedicated interface directly linking the WLAN and cellular chips.

Figure 1:
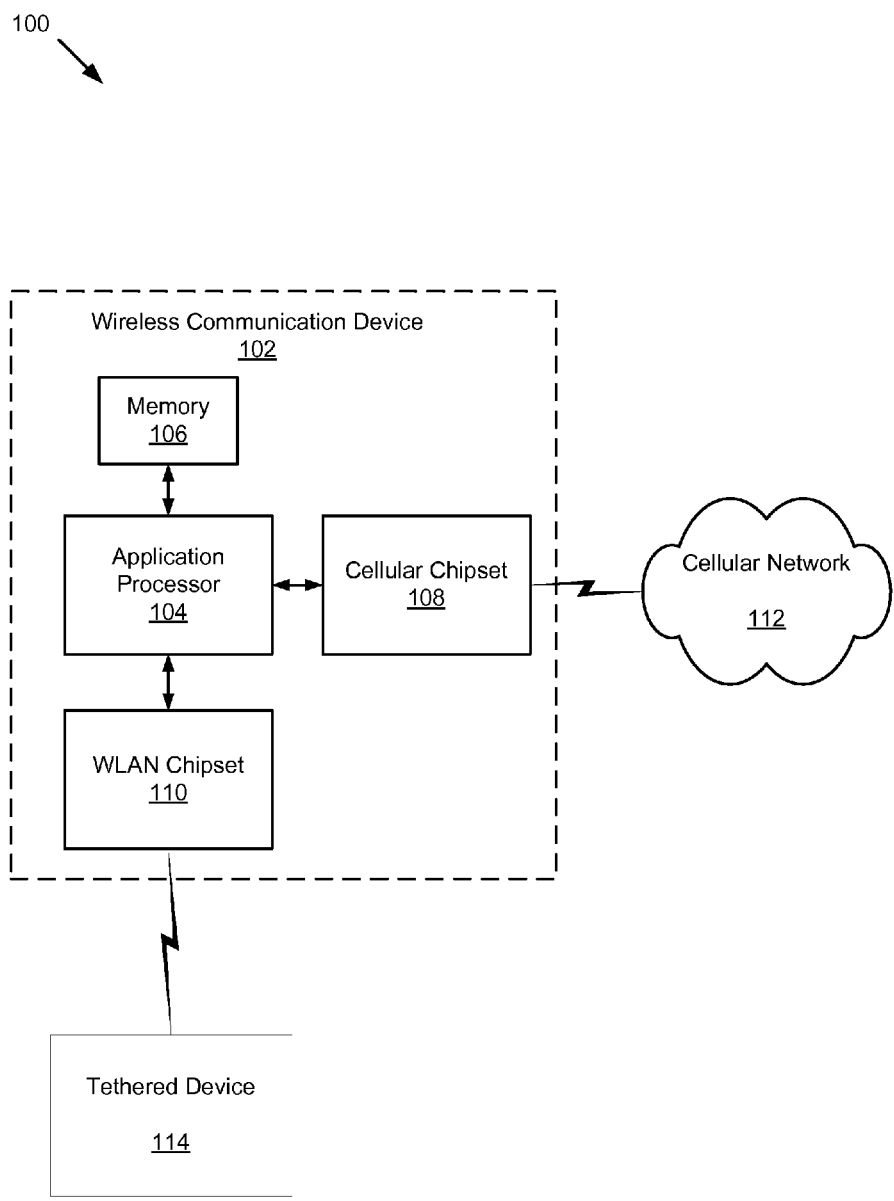
FIG. 1 illustrates a system in accordance with some example embodiments.

FIG. 1 illustrates a system 100 in accordance with some example embodiments. The system 100 can include a wireless communication device 102. By way of non-limiting example, a wireless communication device 102 can be a cellular phone, such as a smart phone device, a tablet computing device, a laptop computing device, or other computing device that can include independent chipsets, such as a cellular chipset 108 and a WLAN chipset 110, which can exchange data to support device operations.

In some example embodiments, the system 100 can further include a cellular network 112. In such example embodiments, the wireless communication device 102 can be configured to establish a connection to the cellular network 112, which can be used to exchange data with one or more remote devices. The connection to the cellular network 112 can be supported by the cellular chipset 108. It will be appreciated that the cellular network 112 can be any type of cellular network. By way of non-limiting example, the cellular network 112 can be a fourth generation (4G) cellular network, such as LTE, LTE-Advanced, and/or other present or future developed 4G cellular network; a third generation (3G) cellular network, such as a Wideband Code Division Multiple Access (WCDMA) or other Universal Mobile Telecommunications System (UMTS) cellular network, such as a Time Division Synchronous Code Division Multiple Access (TD-SCDMA) cellular network, a CDMA2000 cellular network, and/or other 3G cellular network; a second generation (2G) cellular network, such as a Global System for Mobile Communications (GSM) cellular network; some combination thereof; and/or one or more further present or future developed cellular networks.

In some example embodiments, the system 100 can further include a tethered device 114. The tethered device 114 can be any computing device that can establish an association with the wireless communication device 102 to tether the tethered device 114 to the wireless communication device 102 such that the tethered device 114 can share a connection between the wireless communication device 102 and the cellular network 112. By way of non-limiting example, the tethered device 114 can be a desktop computer, laptop computer, tablet computing device, or other computing device that can establish a wireless connection to the wireless communication device 102. In some example embodiments, the tethered device 114 and wireless communication device 102 can associate with each other via a WLAN connection, which can be supported by the WLAN chipset 110. In this regard, the wireless communication device 102 of some example embodiments can be configured to function as a WLAN access point to enable the tethered device 114 to establish a WLAN connection and association with the wireless communication device 102 for purposes of tethering. A WLAN connection between the wireless communication device 102 and tethered device 114 can use any appropriate WLAN technology, including, but not limited to a Wi-Fi connection based on an Institute of Electrical and Electronics Engineers (IEEE) 802.11 standard.

As illustrated in FIG. 1, the wireless communication device 102 can include a plurality of components. It will be appreciated, however, that the components, devices or elements illustrated in and described with respect to FIG. 1 below may not be mandatory and thus some may be omitted in certain embodiments. Additionally, some embodiments of the wireless communication device 102 can include further or different components, devices or elements beyond those illustrated in and described with respect to FIG. 1.

In some example embodiments, the wireless communication device 102 can include an application processor 104 that is configurable to perform actions in accordance with one or more example embodiments disclosed herein. In this regard, the application processor 104 can be configured to perform and/or control performance of one or more functionalities of the wireless communication device 102 in accordance with various example embodiments, and thus can provide means for performing functionalities of the wireless communication device 102 in accordance with various example embodiments. The application processor 104 can be configured to perform data processing, application execution, and/or other processing and management services according to one or more example embodiments.

The application processor 104 can be embodied in a variety of forms. For example, the application processor 104 can be embodied as various processing means such as processing circuitry, a microprocessor, a coprocessor, a controller or various other hardware-implemented computing or processing devices including integrated circuits such as, for example, an ASIC (application specific integrated circuit), an FPGA (field programmable gate array), some combination thereof, or the like. Although illustrated as a single processor, it will be appreciated that the application processor 104 can comprise a plurality of processors. The plurality of processors can be in operative communication with each other and can be collectively configured to perform one or more functionalities of the wireless communication device 102 as described herein. In some example embodiments, the application processor 104 can be configured to execute instructions that can be stored in the memory 106 or that can be otherwise accessible to the application processor 104. As such, whether configured by hardware or by a combination of hardware and software, the application processor 104 capable of performing operations according to various embodiments while configured accordingly.

As will be further described herein below, including with respect to FIGS. 2-4, the topography of the application processor 104 in accordance with some example embodiments can include two or more portions. One portion of the application processor 104 in accordance with such example embodiments can be powered via a dedicated power domain, and can include one or more root complexes, which can be used to interface two or more chipsets, such as the cellular chipset 108 and WLAN chipset 110. In this regard, it will be appreciated that while several embodiments are described with respect to bridging WLAN and cellular chipsets, embodiments disclosed herein are not so limited, as some example embodiments can be applied to bridging any two chipsets that can be implemented on a computing device, such as the wireless communication device 102.

In some example embodiments, the wireless communication device 102 can include memory 106, which can include one or more memory devices. Memory 106 can include fixed and/or removable memory devices. In some embodiments, the memory 106 can provide a non-transitory computer-readable storage medium that can store computer program instructions that can be executed by the application processor 104. In this regard, the memory 106 can be configured to store information, data, applications, instructions and/or the like for enabling the wireless communication device 102 to carry out various functions in accordance with one or more example embodiments. In some embodiments, the memory 106, or a portion(s) thereof, can be integrated into the application processor 104. Additionally or alternatively, the memory 106, or a portion(s) thereof, can be in communication with the application processor 104, via a bus.

The wireless communication device 102 can further include a cellular chipset 108. The cellular chipset 108 can include one or more chips, which can be configured to support a connection between the wireless communication device 102 and cellular network 112. The cellular chipset 108 of some example embodiments can be interfaced with the application processor 104. The interface between the cellular chipset 108 and application processor 104 can, for example, be a Peripheral Component Interconnect Express (PCIe) bus interface or other high speed interface that can be used to interface a chipset with the application processor 104. Architectures for interfacing the application processor 104 and cellular chipset 108 in accordance with various example embodiments will be described further herein below, including with respect to FIGS. 2-4.

The wireless communication device 102 can further include a WLAN chipset 110. The WLAN chipset 110 can include one or more chips, which can be configured to support a WLAN connection between the wireless communication device 102 and a further device, such as a tethered device 114. The WLAN chipset 110 can be configured to support any type of WLAN connection, including, but not limited to a Wi-Fi connection based on an Institute of Electrical and Electronics Engineers (IEEE) 802.11 standard. The WLAN chipset 110 of some example embodiments can be interfaced with the application processor 104. The interface between the WLAN chipset 110 and application processor 104 can, for example, be a PCIe bus interface or other high speed interface that can be used to interface a chipset with the application processor 104. Architectures for interfacing the application processor 104 and WLAN chipset 110 in accordance with various example embodiments will be described further herein below, including with respect to FIGS. 2-4.

Figure 2:
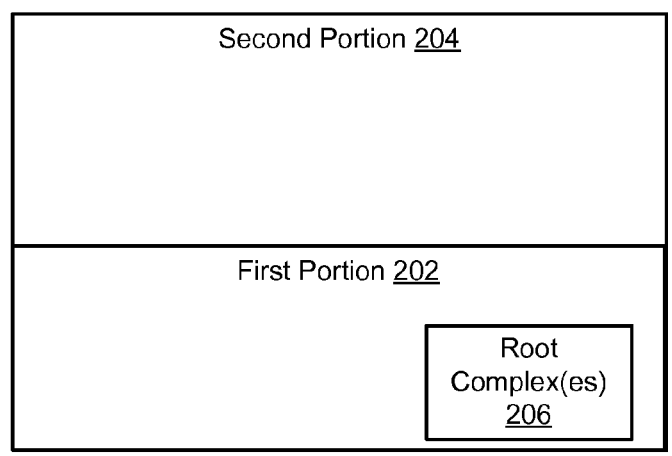
FIG. 2 illustrates the topography of an application processor in accordance with some example embodiments.

FIG. 2 illustrates the topography of an application processor 104 in accordance with some example embodiments. As illustrated in FIG. 2, the application processor 104 of some example embodiments can be divided into multiple portions, including a first portion 202 and second portion 204. In some example embodiments, the second portion 204 can be subdivided into two or more sub portions.

The first portion 202 can include one or more root complexes, illustrated as the root complex(es) 206. The root complex(es) 206 can be coupled to one or more interfaces for purposes of bridging chipsets that can be bridged via the application processor 104 in accordance with various example embodiments. For example, in some embodiments, the root complex(es) 206 can include a first port and a second port. The first port can be interfaced with the WLAN chipset 110, such as via a PCIe bus interface. The second port can be interfaced with the cellular chipset 108, such as via a PCIe bus interface. When bridging chipsets, the root complex(es) 206 can be configured to implement a peer-to-peer function (P2P) to bridge data between the chipsets. For example, in embodiments in which the root complex(es) 206 can be configured to bridge the cellular chipset 108 and WLAN chipset 110, the root complex(es) 206 can be configured to convey data between the cellular chipset 108 and the WLAN chipset 110 by forwarding data received from the cellular chipset 108 to the WLAN chipset 110 and forwarding data received from the WLAN chipset 110 to the cellular chipset 108. Thus, for example, in embodiments in which the cellular chipset 108 and WLAN chipset 110 exchange data for supporting tethering, the root complex(es) 206 can bridge the cellular chipset 108 and WLAN chipset 110 to convey data exchanged between the tethered device 114 and the cellular network 112. As another example, the root complex(es) 206 can bridge the cellular chipset 108 and the WLAN chipset to convey data for supporting in-device coexistence of WLAN and cellular connections between the WLAN chipset 110 and the cellular chipset 108. Such data can, for example, mitigate potential coexistence problems between WLAN and cellular operation. As a further example, the root complex(es) 206 can bridge the cellular chipset 108 and the WLAN chipset to convey data for enabling usage of the cellular chipset 108 by the WLAN chipset 110 for WLAN communication. More detailed illustrations of the architecture of the root complex (es) 206 and interfacing with the cellular chipset 108 and WLAN chipset 110 in accordance with some example embodiments are illustrated in and described with respect to FIGS. 3 and 4.

The first portion 202 of the application processor 104 can be powered via a dedicated power domain. The dedicated power domain can be independent of one or more further power domains that can be configured to power the second portion 204 of the application processor 104. As such, the second portion 204 of the application processor 104 can be placed in a sleep state when the application processor 104 is not performing any further activity other than bridging chipsets. When the second portion 204 is in a sleep state, the second portion 204 may not draw any power from its power domain(s). Alternatively, when the second portion 204 is in a sleep state, the second portion 204 may not draw more than a minimum baseline amount of power. Regardless, the second portion 204 can consume less power when in a sleep state than when in an active, or awake, state. Accordingly, implementation of independent power domains for powering various portions of the application processor 104 can be sued to reduce power consumption when bridging chipsets via the root complex(es) 206.

In embodiments in which the second portion 204 is subdivided into two or more sub portions, each respective sub portion can be powered via an independent power domain such that respective inactive portions can be selectively placed in a sleep state when inactive to provide more refined control over power consumption by the application processor 104.

In some example embodiments, the root complex(es) 206 can be configured to activate the second portion 204 of the application processor 104 from a sleep state in response to occurrence of an event in which the second portion 204 of the application processor 104 needs to be activated to perform an activity.

Figure 3:
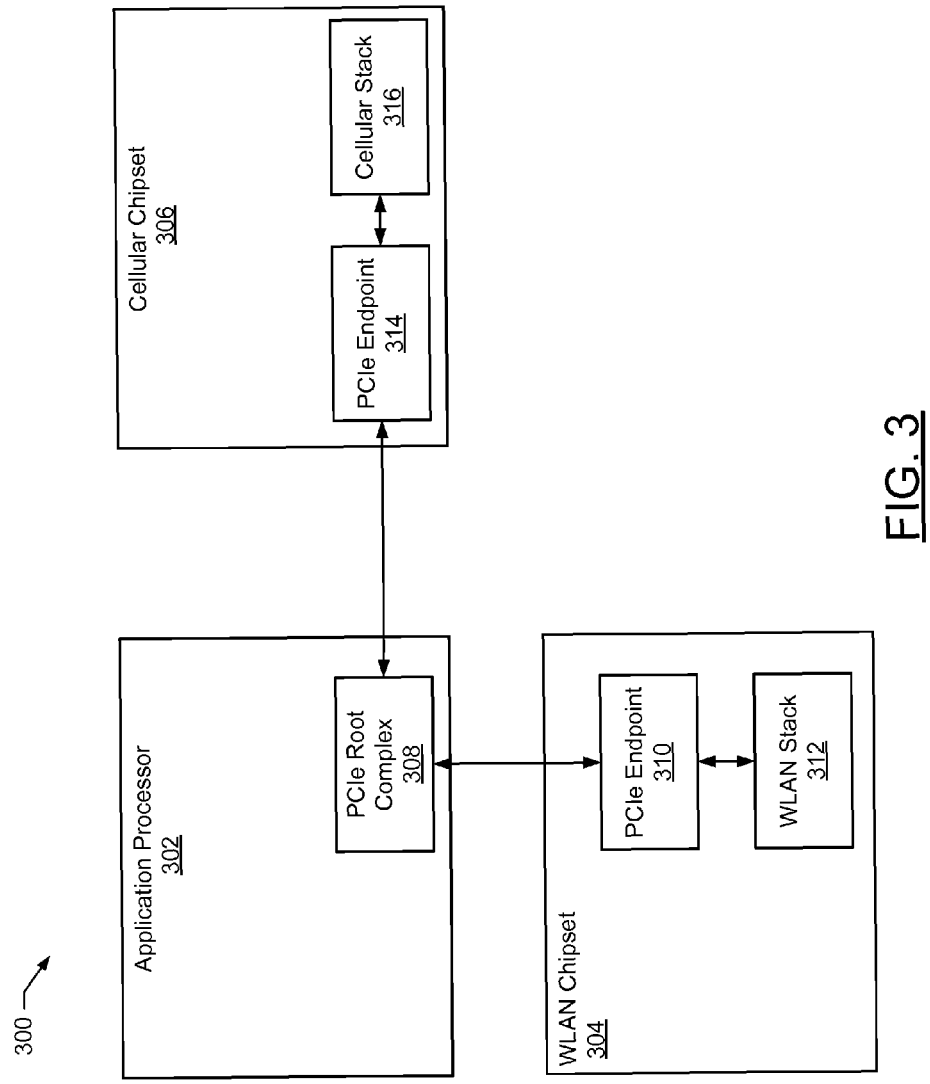
FIG. 3 illustrates an example architecture in accordance with some example embodiments.

FIG. 3 illustrates an example architecture 300 in accordance with some example embodiments. The architecture 300 illustrates bridging of a WLAN chipset 304 and cellular chipset 306 via a PCIe root complex 308 implemented on an application processor 302. In this regard, the architecture 300 can be used to bridge the WLAN chipset 304 and cellular chipset 306 to convey any data that can be exchanged between a WLAN chipset and a cellular chipset, such as data (e.g., uplink and downlink data) that can be exchanged between a tethered device 114 and cellular network 112 in accordance with some example embodiments. While the architecture 300 illustrates bridging of a WLAN chipset and a cellular chipset, it will be appreciated that the architecture 300 can be used to bridge other types of independent chipsets in accordance with various embodiments.

The application processor 302 can be an embodiment of the application processor 104. As such, the PCIe root complex 308 can be an embodiment of the root complex(es) 206 in which a single root complex can be used to bridge chipsets. While the root complex illustrated in FIG. 3 is a PCIe root complex, it will be appreciated that a root complex that can be implemented in accordance with an interface standard other than PCIe can be substituted for the PCIe root complex 308 in accordance with other embodiments. As the PCIe root complex 308 can be an embodiment of the root complex(es) 206, it will be appreciated that the PCIe root complex 308 can be powered via a dedicated power domain that can be independent of a power domain that can power a further portion of the application processor 302 (e.g., a second portion 204 of the application processor 302).

The WLAN chipset 304 can be an embodiment of the WLAN chipset 110. The PCIe root complex 308 can include a first port, which can be coupled to the WLAN chipset 304. More particularly, the first port of the PCIe root complex 308 can be coupled to a PCIe endpoint 310 that can be implemented on the WLAN chipset 304. The PCIe endpoint 310 can, in turn, be coupled to a WLAN stack 312. It will be appreciated that in embodiments using an interface other than a PCIe bus interface, an appropriate endpoint for the interface used can be substituted for the PCIe endpoint 310. Although not illustrated in FIG. 3, the WLAN chipset 304 can further include an onboard processor, memory, and/or other chip(s)/circuitry that can be configured to support operation of the WLAN chipset 304.

The cellular chipset 306 can be an embodiment of the cellular chipset 108. The PCIe root complex 308 can additionally include a second port, which can be coupled to the cellular chipset 306. More particularly, the first port of the PCIe root complex 308 can be coupled to a PCIe endpoint 314 that can be implemented on the cellular chipset 306. The PCIe endpoint 314 can, in turn, be coupled to a cellular stack 316. It will be appreciated that in embodiments using an interface other than a PCIe bus interface, an appropriate endpoint for the interface used can be substituted for the PCIe endpoint 314. Although not illustrated in FIG. 3, the cellular chipset 306 can further include an onboard processor, memory, and/or one or other chip(s)/circuitry that can be configured to support operation of the cellular chipset 306.

The PCIe root complex 308 can be configured to implement a P2P function to bridge the WLAN chipset 304 and cellular chipset 306. In this regard, data can be passed from the WLAN stack 312 to the PCIe endpoint 310, from which the data can be communicated to the PCIe root complex 308 over the interface between the PCIe endpoint 310 and the PCIe root complex 308. The PCIe root complex 308 can, in turn, forward data received from the WLAN chipset 304 to the cellular chipset 306 via the interface between the PCIE root complex 308 and the PCIe endpoint 314. The PCIe endpoint 314 can, in turn, pass data received from the PCIe root complex 308 on to the cellular stack 316.

Similarly, data can be passed from the cellular stack 316 to the PCIe endpoint 314, from which the data can be communicated to the PCIe root complex 308 over the interface between the PCIe endpoint 314 and the PCIe root complex 308. The PCIe root complex 308 can in turn forward data received from the cellular chipset 306 to the WLAN chipset 304 via the interface between the PCIe root complex 308 and the PCIe endpoint 310. The PCIe endpoint 310 can, in turn, pass data received from the PCIe root complex 308 on to the WLAN stack 312.

Figure 4:
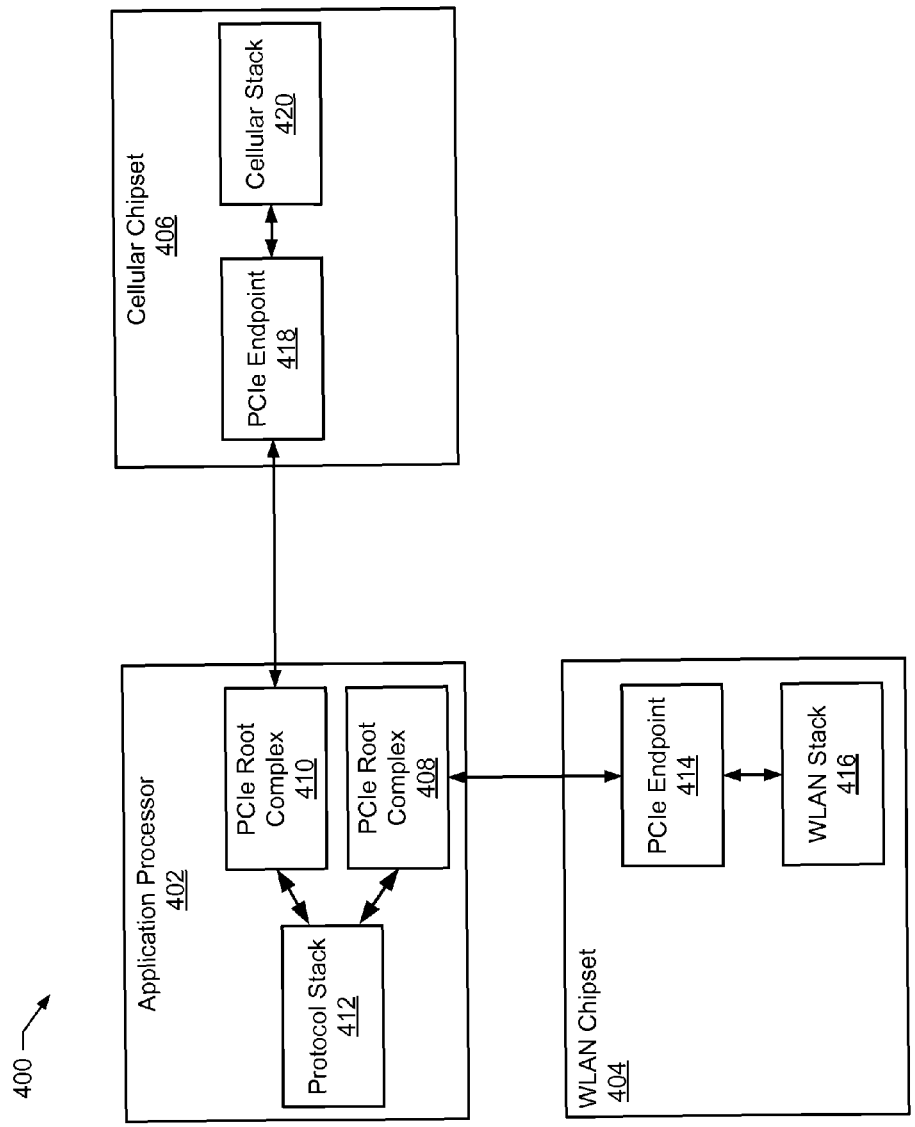
FIG. 4 illustrates another example architecture in accordance with some example embodiments.

FIG. 4 illustrates an alternative example architecture 400 in accordance with some example embodiments. The architecture 400 illustrates bridging of a WLAN chipset 404 and cellular chipset 406 via an application processor 402. In this regard, the architecture 400 can be used to bridge the WLAN chipset 404 and cellular chipset 406 to convey any data that can be exchanged between a WLAN chipset and a cellular chipset, such as data (e.g., uplink and downlink data) that can be exchanged between a tethered device 114 and cellular network 112 in accordance with some example embodiments. While the architecture 400 illustrates bridging of a WLAN chipset and a cellular chipset, it will be appreciated that the architecture 400 can be used to bridge other types of independent chipsets in accordance with various embodiments.

The application processor 402 can be an embodiment of the application processor 104. The application processor 402 can include a PCIe root complex 408 and PCIe root complex 410, which can be interfaced via a protocol stack 412. The protocol stack 412 can be any type of protocol stack. In this regard, the type of the protocol stack can depend at least in part on a type of data that can be exchanged between the WLAN chipset 404 and cellular chipset 406. By way of non-limiting example, the protocols tack 412 can be a Transmission Control Protocol/Internet Protocol (TCP/IP) stack. In this regard, the architecture 400 is representative of some example embodiments in which the root complex(es) 206 includes two root complexes that can be collectively used to bridge chipsets. While the root complexes illustrated in FIG. 4 are PCIe root complexes, it will be appreciated that a root complex that can be implemented in accordance with an interface standard other than PCIe can be substituted for the PCIe root complex 408 and/or PCIe root complex 410 in accordance with other embodiments. As the PCIe root complexes 408 and 410 can collectively represent an embodiment of the root complex(es) 206, it will be appreciated that the PCIe root complex 408 and PCIe root complex 410 can be collectively powered via a dedicated power domain that can be independent of a power domain that can power a further portion of the application processor 402 (e.g., a second portion 204 of the application processor 402).

The WLAN chipset 404 can be an embodiment of the WLAN chipset 110. The PCIe root complex 408 can include a port, which can be coupled to the WLAN chipset 404. More particularly, the port of the PCIe root complex 408 can be coupled to a PCIe endpoint 414 that can be implemented on the WLAN chipset 404. The PCIe endpoint 414 can, in turn, be coupled to a WLAN stack 416. It will be appreciated that in embodiments using an interface other than a PCIe bus interface, an appropriate endpoint for the interface used can be substituted for the PCIe endpoint 414. Although not illustrated in FIG. 4, the WLAN chipset 404 can further include an onboard processor, memory, and/or other chip(s)/circuitry that can be configured to support operation of the WLAN chipset 404.

The cellular chipset 406 can be an embodiment of the cellular chipset 108. The PCIe root complex 410 can include a port, which can be coupled to the cellular chipset 406. More particularly, the port of the PCIe root complex 410 can be coupled to a PCIe endpoint 418 that can be implemented on the cellular chipset 406. The PCIe endpoint 418 can, in turn, be coupled to a cellular stack 420. It will be appreciated that in embodiments using an interface other than a PCIe bus interface, an appropriate endpoint for the interface used can be substituted for the PCIe endpoint 418. Although not illustrated in FIG. 4, the cellular chipset 406 can further include an onboard processor, memory, and/or one or other chip(s)/circuitry that can be configured to support operation of the cellular chipset 406.

The PCIe root complex 408 and PCIe root complex 410 can be collectively configured to implement a P2P function to bridge the WLAN chipset 404 and cellular chipset 406. In this regard, data can be passed from the WLAN stack 416 to the PCIe endpoint 414, from which the data can be communicated to the PCIe root complex 408 over the interface between the PCIe endpoint 414 and the PCIe root complex 408. The PCIe root complex 408 can, in turn, forward data received from the WLAN chipset 404 to the protocol stack 412, from which the data can be passed to the PCIe root complex 410. The PCIe root complex 410 can be configured to forward data received from the protocol stack 412 to the cellular chipset 406 via the interface between the PCIE root complex 410 and the PCIe endpoint 418. The PCIe endpoint 418 can, in turn, pass data received from the PCIe root complex 410 on to the cellular stack 420.

Similarly, data can be passed from the cellular stack 420 to the PCIe endpoint 418, from which the data can be communicated to the PCIe root complex 410 over the interface between the PCIe endpoint 418 and the PCIe root complex 410. The PCIe root complex 410 can in turn forward data received from the cellular chipset 406 to the protocol stack 412, from which the data can be passed to the PCIe root complex 408. The PCIe root complex 408 can be configured to forward data received from the protocol stack 412 to the WLAN chipset 404 via the interface between the PCIE root complex 408 and the PCIe endpoint 414. The PCIe endpoint 414 can, in turn, pass data received from the PCIe root complex 408 on to the WLAN stack 416.

Figure 5:
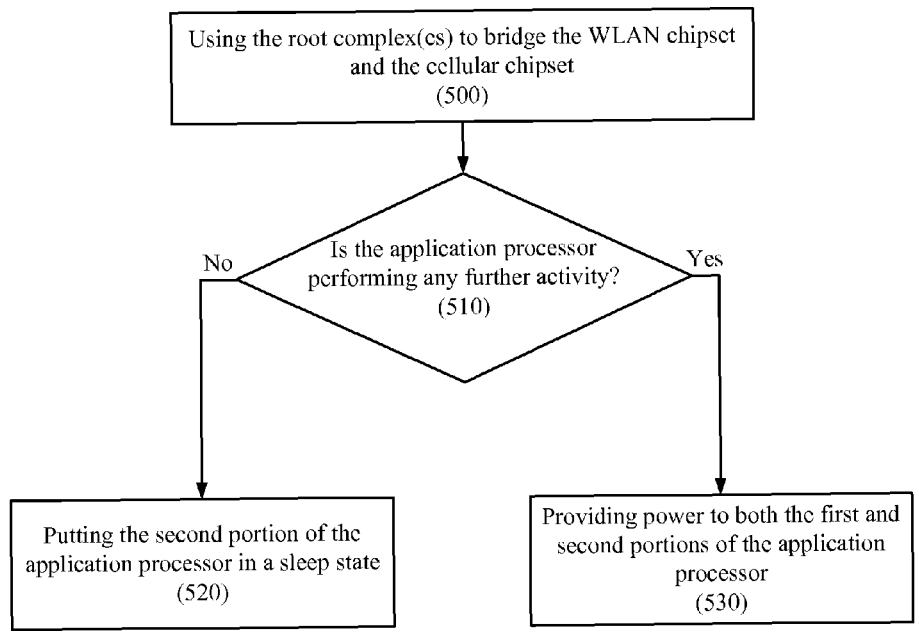
FIG. 5 illustrates a flowchart according to an example method for reducing power consumption when bridging independent chipsets in accordance with some example embodiments.

FIG. 5 illustrates a flowchart according to an example method for reducing power consumption when bridging independent chipsets in accordance with some example embodiments. Operation 500 can include using the root complex(es) 206 to bridge the WLAN chipset 110 and cellular chipset 108 to convey data between the WLAN chipset 110 and the cellular chipset 108. Operation 510 can include determining whether the application processor 104 is performing any further activity beyond bridging the WLAN chipset 110 and cellular chipset 108. For example, operation 510 can include determining whether any activity is being performed by the second portion 204 of the application processor 104. In an instance in which it is determined that the application processor 104 is not performing any further activity, the method can proceed to operation 520, which can include putting the second portion 204 of the application processor 104 in a sleep state. In this regard, the root complex(es) 206 can draw power via the dedicated power domain that can provide power to the first portion 202 of the application processor 104, while the second portion 204 of the application processor 104 can be in a sleep state.

If, however, it is determined at operation 510 that the application processor 104 is performing a further activity, the method can proceed to operation 530, which can include providing power to both the first portion 202 and the second portion 204 of the application processor 104. In the event that the application processor 104 later concludes performance of activities with the exception of bridging the WLAN chipset 110 and cellular chipset 108, the second portion 204 of the application processor can be put in a sleep state.

Figure 6:
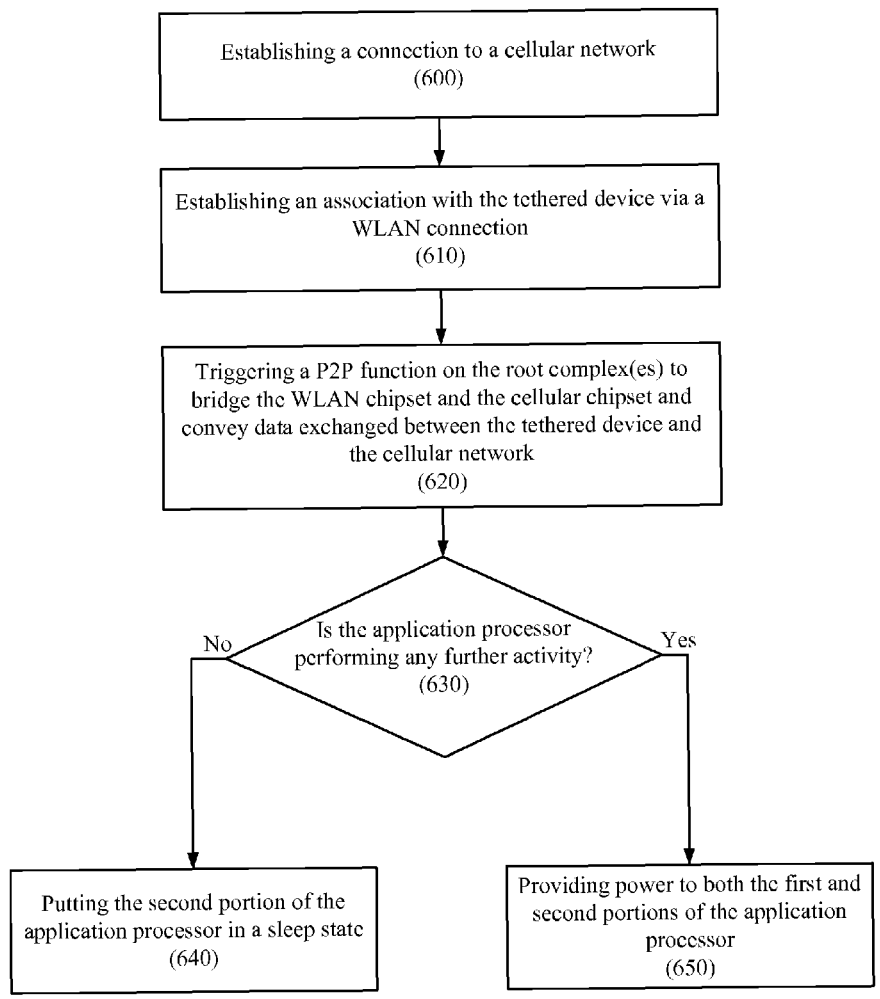
FIG. 6 illustrates a flowchart according to an example method for reducing power consumption when bridging independent chipsets to support tethering in accordance with some example embodiments.

FIG. 6 illustrates a flowchart according to an example method for reducing power consumption when bridging independent chipsets to support tethering in accordance with some example embodiments. Operation 600 can include the wireless communication device 102 establishing a connection to the cellular network 112. The connection to the cellular network 112 can be supported by the cellular chipset 108. Operation 610 can include the wireless communication device 102 establishing an association with the tethered device 114 via a WLAN connection. The WLAN connection between the wireless communication device 102 and the tethered device 114 can be supported by the WLAN chipset 110. Operation 620 can include the application processor 104 triggering a P2P function on the root complex(es) 206 to bridge the WLAN chipset 110 and the cellular chipset 108 and convey data exchanged between the tethered device 114 and the cellular network 112. Operation 630 can include determining whether the application processor 104 is performing any further activity beyond bridging the WLAN chipset 110 and cellular chipset 108. For example, operation 630 can include determining whether any activity is being performed by the second portion 204 of the application processor 104. In an instance in which it is determined that the application processor 104 is not performing any further activity, the method can proceed to operation 640, which can include putting the second portion 204 of the application processor 104 in a sleep state. In this regard, the root complex(es) 206 can draw power via the dedicated power domain that can provide power to the first portion 202 of the application processor 104, while the second portion 204 of the application processor 104 can be in a sleep state.

If, however, it is determined at operation 630 that the application processor 104 is performing a further activity, the method can proceed to operation 650, which can include providing power to both the first portion 202 and the second portion 204 of the application processor 104. In the event that the application processor 104 later concludes performance of activities with the exception of bridging the WLAN chipset 110 and cellular chipset 108, the second portion 204 of the application processor can be put in a sleep state.

Figure 7:
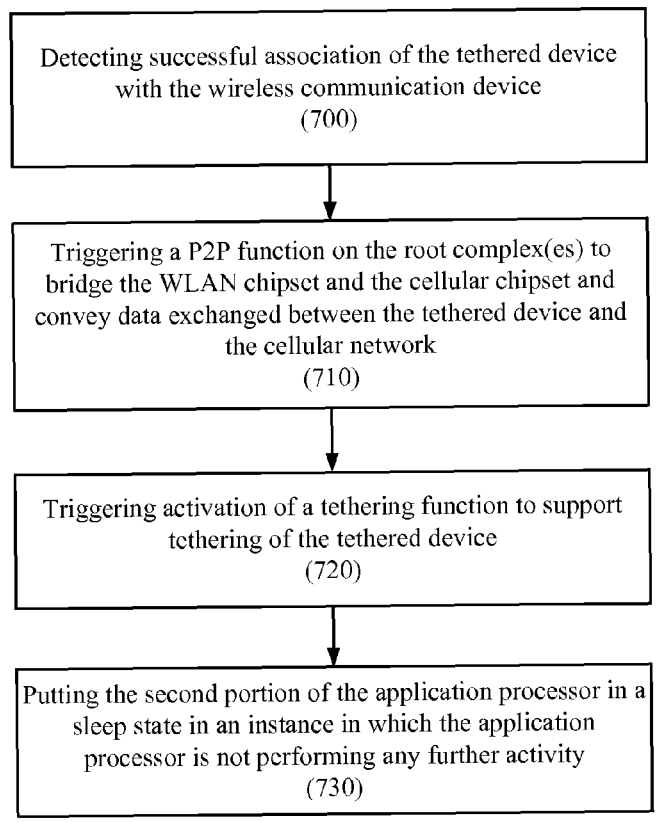
FIG. 7 illustrates a flowchart according to another example method for reducing power consumption when bridging independent chipsets to support tethering in accordance with some example embodiments.

FIG. 7 illustrates a flowchart according to another example method for reducing power consumption when bridging independent chipsets to support tethering in accordance with some example embodiments. In this regard, FIG. 7 illustrates operations that can be performed responsive to successful association of the tethered device 114 with the wireless communication device 102, such as in response to successful completion of operation 610, as illustrated in FIG. 6 and discussed above. Operation 700 can include the application processor 104 detecting successful association of the tethered device 114 with the wireless communication device 102. This detection can, for example, be performed based on successful completion of operation 610. Ensuing operations 710-730 can be performed responsive to operation 710. Operation 710 can include the application processor 104 triggering a P2P function on the root complex(es) 206 to bridge the WLAN chipset 110 and the cellular chipset 108 and convey data exchanged between the tethered device 114 and the cellular network 112. Operation 720 can include the application processor 104 triggering activation of a tethering function to support tethering of the tethered device 114 so that the connection between the wireless communication device 102 and cellular network 112 can be shared with the tethered device 114. For example, operation 720 can include the application processor 104 triggering the cellular chipset 108 and/or the WLAN chipset 110 to activate the tethering function. Operation 730 can include putting the second portion 204 of the application processor 104 in a sleep state in an instance in which the application processor 104 is not performing any further activity.

It will be appreciated that while various example embodiments have been described with respect to the use of a root complex(es) that any bridge that can be configured to bridge a processor, such as the application processor 104, with a bus system that can be used to interface the bridge entity with the cellular chipset 108 and/or WLAN chipset 110 can be substituted for a root complex within the scope of the disclosure. As such, examples described herein in terms of usage of a root complex are to be construed as non-limiting example of some embodiments, which can be implemented with another type of bridge substituted for a root complex within the scope of the disclosure.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A wireless communication device for sharing a network connection, the wireless communication device comprising:
   a wireless local area network (WLAN) chipset;
   a cellular chipset; and
   an application processor comprising a first portion and a second portion, the first portion of the application processor comprising at least one root complex powered via a dedicated power domain, the dedicated power domain being independent of at least one second power domain configured to power the second portion of the application processor;
   wherein the WLAN chipset is coupled to a first port of the at least one root complex via a first Peripheral Component Interconnect Express (PCIe) bus interface;
   wherein the cellular chipset is coupled to a second port of the at least one root complex via a second PCIe bus interface;
   wherein the wireless communication device is configured to share a connection to a cellular network supported by the cellular chipset with a tethered device coupled to the wireless communication device via a WLAN connection supported by the WLAN chipset; and
   wherein the at least one root complex is configured to use power received via the dedicated power domain to implement a peer-to-peer (P2P) function to bridge the WLAN chipset and the cellular chipset to convey data exchanged between the tethered device and the cellular network while the second portion of the application processor is sleeping.

2. The wireless communication device of claim 1, wherein the at least one root complex comprises a single root complex comprising the first port and the second port.

3. The wireless communication device of claim 1, wherein the application processor is configured, in response to association of the tethered device with the wireless communication device via the WLAN connection, to:
   trigger the P2P function;
   trigger one or more of the cellular chipset or the WLAN chipset to activate a tethering function to support tethering of the tethered device; and
   in an instance in which the application processor is not performing any further activity, to put the second portion of the application processor in a sleep state.

4. A wireless communication device comprising:
   a wireless local area network (WLAN) chipset;
   a cellular chipset; and
   an application processor comprising a first portion and a second portion, the first portion of the application processor comprising at least one root complex powered via a dedicated power domain, the dedicated power domain being independent of at least one second power domain configured to power the second portion of the application processor;
   wherein the WLAN chipset is coupled to a first port of the at least one root complex via a first interface;
   wherein the cellular chipset is coupled to a second port of the at least one root complex via a second interface; and
   wherein the at least one root complex is configured to use power received via the dedicated power domain to bridge the WLAN chipset and the cellular chipset to convey data between the WLAN chipset and the cellular chipset while the second portion of the application processor is sleeping.

5. The wireless communication device of claim 4, wherein the first interface and the second interface comprise Peripheral Component Interconnect Express (PCIe) bus interfaces.

6. The wireless communication device of claim 4, wherein the at least one root complex is configured to implement a peer-to-peer (P2P) function configured to bridge the WLAN chipset and the cellular chipset.

7. The wireless communication device of claim 4, wherein the at least one root complex comprises a single root complex comprising the first port and the second port.

8. The wireless communication device of claim 4, wherein the wireless communication device is configured to share a connection to a cellular network supported by the cellular chipset with a tethered device coupled to the wireless communication device via a WLAN connection supported by the WLAN chipset, and wherein the at least one root complex is configured to bridge the WLAN chipset and the cellular chipset to convey data exchanged between the tethered device and the cellular network.

9. The wireless communication device of claim 8, wherein the application processor is configured, in response to association of the tethered device with the wireless communication device via the WLAN connection, to:

trigger a peer-to-peer (P2P) function implemented on the at least one root complex to bridge the WLAN chipset and the cellular chipset;
trigger one or more of the cellular chipset or the WLAN chipset to activate a tethering function to support tethering of the tethered device; and
in an instance in which the application processor is not performing any further activity, to put the second portion of the application processor in a sleep state.

10. The wireless communication device of claim 4, wherein the at least one root complex is configured to bridge the WLAN chipset and the cellular chipset to convey data for supporting in-device coexistence of WLAN and cellular connections between the WLAN chipset and the cellular chipset.

11. The wireless communication device of claim 4, wherein the at least one root complex is configured to bridge the WLAN chipset and the cellular chipset to convey data for enabling usage of the cellular chipset by the WLAN chipset for WLAN communication.

12. A method for sharing a network connection, the method comprising:
a wireless communication device establishing a connection to a cellular network, the wireless communication device comprising a wireless local area network (WLAN) chipset, a cellular chipset, and an application processor, the connection to the cellular network being supported by the cellular chipset, wherein the application processor comprises a first portion and a second portion, the first portion of the application processor comprising at least one root complex powered via a dedicated power domain, the dedicated power domain being independent of at least one second power domain configured to power the second portion of the application processor, wherein the at least one root complex comprises a first port coupled to the WLAN chipset via a first interface and a second port coupled to the cellular chipset via a second interface;
the wireless communication device establishing an association with a tethered device via a WLAN connection supported by the WLAN chipset to share the connection to the cellular network with the tethered device; and
the wireless communication device triggering a peer-to-peer (P2P) function on the at least one root complex to bridge the WLAN chipset and the cellular chipset to convey data exchanged between the tethered device and the cellular network,
the at least one root complex using power received via the dedicated power domain to bridge the WLAN chipset and the cellular chipset while the second portion of the application processor is sleeping in an instance in which application processor is not performing any further activity.

13. The method of claim 12, wherein the first interface and the second interface comprise Peripheral Component Interconnect Express (PCIe) bus interfaces.

14. The method of claim 12, wherein the at least one root complex comprises a single root complex comprising the first port and the second port.

15. The method of claim 12, wherein triggering the P2P function is performed in response to the wireless communication device successfully establishing the association with the tethered device via the WLAN connection, the method further comprising, in response to the wireless communication device successfully establishing the association with the tethered device via the WLAN connection:

triggering one or more of the cellular chipset or the WLAN chipset to activate a tethering function to support tethering of the tethered device; and
putting the second portion of the application processor in a sleep state in an instance in which the application processor is not performing any further activity.

16. A computer program product for sharing a network connection, the computer program product comprising at least one non-transitory computer readable storage medium having computer program code stored thereon, the computer program code comprising:
program code for causing a wireless communication device to establish a connection to a cellular network, the wireless communication device comprising a wireless local area network (WLAN) chipset, a cellular chipset, and an application processor, the connection to the cellular network being supported by the cellular chipset, wherein the application processor comprises a first portion and a second portion, the first portion of the application processor comprising a bridge powered via a dedicated power domain, the dedicated power domain being independent of at least one second power domain configured to power the second portion of the application processor, wherein the bridge comprises a first port coupled to the WLAN chipset via a first interface and a second port coupled to the cellular chipset via a second interface;
program code for causing the wireless communication device to establish an association with a tethered device via a WLAN connection supported by the WLAN chipset to share the connection to the cellular network with the tethered device;
program code for triggering a peer-to-peer (P2P) function on the bridge to bridge the WLAN chipset and the cellular chipset to convey data exchanged between the tethered device and the cellular network; and
program code for controlling the bridge using power received via the dedicated power domain to bridge the WLAN chipset and the cellular chipset while the second portion of the application processor is sleeping in an instance in which application processor is not performing any further activity.

17. The computer program product of claim 16, wherein the first interface and the second interface comprise Peripheral Component Interconnect Express (PCIe) bus interfaces.

18. The computer program product of claim 16, wherein the bridge comprise at least one root complex.

19. The computer program product of claim 18, wherein the at least one root complex comprises a single root complex comprising the first port and the second port.

20. The computer program product of claim 16, wherein the program code for triggering the P2P function comprises program code for triggering the P2P function in response to the wireless communication device successfully establishing the association with the tethered device via the WLAN connection, the computer program code further comprising program code for, in response to the wireless communication device successfully establishing the association with the tethered device via the WLAN connection:
triggering one or more of the cellular chipset or the WLAN chipset to activate a tethering function to support tethering of the tethered device; and
putting the second portion of the application processor in a sleep state in an instance in which the application processor is not performing any further activity.

* * * * *